United States Patent
Wulf (10) Patent No.: US 11,052,889 B2
(45) Date of Patent: Jul. 6, 2021

(54) METHOD FOR THE AUTOMATED ELECTRONIC CONTROL OF A BRAKING SYSTEM AND ELECTRONICALLY CONTROLLABLE BRAKING SYSTEM IN A UTILITY VEHICLE

(71) Applicant: WABCO Europe BVBA, Brussels (BE)

(72) Inventor: Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 266 days.

(21) Appl. No.: 16/089,384

(22) PCT Filed: Mar. 13, 2017

(86) PCT No.: PCT/EP2017/000325
§ 371 (c)(1),
(2) Date: Sep. 28, 2018

(87) PCT Pub. No.: WO2017/190819
PCT Pub. Date: Nov. 9, 2017

(65) Prior Publication Data
US 2019/0118786 A1    Apr. 25, 2019

(30) Foreign Application Priority Data

May 2, 2016    (DE) ..................... 10 2016 005 317.8

(51) Int. Cl.
*B60T 8/88* (2006.01)
*B60T 17/22* (2006.01)
(Continued)

(52) U.S. Cl.
CPC ................ *B60T 8/885* (2013.01); *B60T 7/12* (2013.01); *B60T 8/17* (2013.01); *B60T 8/321* (2013.01);
(Continued)

(58) Field of Classification Search
CPC ........ B60T 8/885; B60T 17/22; B60T 13/683; B60T 13/662; B60T 7/12; B60T 8/17;
(Continued)

(56) References Cited

U.S. PATENT DOCUMENTS 6,295,490 B1    9/2001   Streib et al.
6,659,244 B2   12/2003   Goodell
(Continued)

FOREIGN PATENT DOCUMENTS

DE        2818813 C3    3/1996
DE       19750392 A1    5/1998
(Continued)

*Primary Examiner* — Sze-Hon Kong
(74) *Attorney, Agent, or Firm* — Leydig, Voit & Mayer, Ltd.

(57) ABSTRACT

A method for automatic electronic control of a brake system in a vehicle includes reading a request signal for automatic electronic control of actuators in the vehicle. At least one of the actuators has an influence on actual longitudinal vehicle dynamics of the vehicle, and requests that are to be implemented by the actuators for realizing automatically requested target longitudinal vehicle dynamics are transmitted via the request signal. The method further includes plausibility-checking the request signal to establish whether the requests are, or can be, implemented completely or without error by the actuators, taking into account a tolerance, and determining a correction deceleration and/or a correction velocity if the implementation of at least one of the requests has not taken place, or cannot take place, completely or without error, taking into account the tolerance, in order to specify corrective braking.

25 Claims, 3 Drawing Sheets

(51) Int. Cl.
*B60T 13/68* (2006.01)
*B60T 13/66* (2006.01)
*B60T 7/12* (2006.01)
*B60T 8/17* (2006.01)
*B60T 8/32* (2006.01)
*B60T 8/58* (2006.01)
*B60T 8/96* (2006.01)
*B60W 10/10* (2012.01)
*B60W 10/184* (2012.01)
*B60W 30/18* (2012.01)

(52) U.S. Cl.
CPC .............. *B60T 8/3205* (2013.01); *B60T 8/58* (2013.01); *B60T 8/96* (2013.01); *B60T 13/662* (2013.01); *B60T 13/683* (2013.01); *B60T 17/22* (2013.01); *B60W 10/10* (2013.01); *B60W 10/184* (2013.01); *B60W 30/18109* (2013.01); *B60T 2230/00* (2013.01); *B60T 2250/04* (2013.01); *B60T 2260/04* (2013.01); *B60T 2270/10* (2013.01); *B60T 2270/402* (2013.01); *B60T 2270/413* (2013.01); *B60W 2510/10* (2013.01); *B60W 2520/00* (2013.01); *B60W 2520/10* (2013.01); *B60W 2520/105* (2013.01); *B60W 2710/10* (2013.01); *B60W 2710/18* (2013.01); *B60W 2720/10* (2013.01); *B60W 2720/24* (2013.01)

(58) Field of Classification Search
CPC .......... B60T 8/3205; B60T 8/321; B60T 8/58; B60T 8/96; B60T 2230/00; B60T 2250/04; B60T 2260/04; B60T 2270/10; B60T 2270/402; B60T 2270/413; B60W 10/10; B60W 10/184; B60W 30/18109; B60W 2510/10; B60W 2520/00; B60W 2520/10; B60W 2520/105; B60W 2710/10; B60W 2710/18; B60W 2720/10; B60W 2720/24; B60Y 2400/81
See application file for complete search history.

(56) References Cited

U.S. PATENT DOCUMENTS

| | | | |
|---|---|---|---|
| 7,520,572 B2 | 4/2009 | Hatipoglu et al. | |
| 8,746,812 B2 * | 6/2014 | Albright | B60T 7/20 303/123 |
| 2004/0162650 A1 * | 8/2004 | Kueperkoch | B60G 17/0185 701/29.2 |
| 2005/0127749 A1 * | 6/2005 | Hartmann | F16D 65/568 303/122 |
| 2005/0218719 A1 | 10/2005 | Hatipoglu et al. | |
| 2006/0152075 A1 | 7/2006 | Goebels et al. | |
| 2013/0060442 A1 * | 3/2013 | Kaster | B60T 8/885 701/82 |
| 2013/0218407 A1 * | 8/2013 | Jungbecker | B60T 7/042 701/34.4 |
| 2013/0221735 A1 | 8/2013 | Kiel et al. | |
| 2015/0084402 A1 | 3/2015 | Tober et al. | |
| 2016/0167653 A1 * | 6/2016 | Malone | B60W 10/18 701/23 |
| 2016/0236662 A1 * | 8/2016 | Neu | B60T 8/3275 |
| 2016/0311422 A1 * | 10/2016 | van Zanten | B60T 8/4081 |
| 2016/0368491 A1 | 12/2016 | Hauler et al. | |
| 2017/0259795 A1 * | 9/2017 | Das | B60W 30/143 |
| 2018/0001879 A1 * | 1/2018 | Witte | B60T 7/042 |
| 2018/0029604 A1 * | 2/2018 | Niino | B60W 10/20 |
| 2018/0065607 A1 * | 3/2018 | Masuda | B60T 8/321 |
| 2018/0170374 A1 * | 6/2018 | Otsuka | B60W 50/02 |

FOREIGN PATENT DOCUMENTS

| | | |
|---|---|---|
| DE | 19943960 A1 | 3/2001 |
| DE | 102010050578 A1 | 5/2012 |
| DE | 102013213171 A1 | 1/2015 |
| DE | 102013015949 A1 | 3/2015 |
| DE | 102014013882 A1 | 3/2015 |
| DE | 102014006615 A1 | 11/2015 |
| EP | 1530529 B1 | 5/2005 |
| EP | 1730006 B1 | 12/2006 |
| EP | 2942249 A1 | 11/2015 |

* cited by examiner

METHOD FOR THE AUTOMATED ELECTRONIC CONTROL OF A BRAKING SYSTEM AND ELECTRONICALLY CONTROLLABLE BRAKING SYSTEM IN A UTILITY VEHICLE

CROSS REFERENCE TO RELATED APPLICATIONS

This application is a U.S. National Stage Application under 35 U.S.C. § 371 of International Application No. PCT/EP2017/000325 filed on Mar. 13, 2017, and claims benefit to German Patent Application No. DE 10 2016 005 317.8 filed on May 2, 2016. The International Application was published in German on Nov. 9, 2017, as WO 2017/1908169 A1 under PCT Article 21(2).

FIELD

The invention relates to a method for the automatic electronic control of a brake system and an electronically controllable brake system in a utility vehicle, in particular in an automatically controllable utility vehicle.

BACKGROUND

In vehicles, in particular utility vehicles, having a pneumatic brake system, in particular designed as an electronic service brake system (EBS), control valves, for example relay valves or axle modulators, can be electronically controlled by a control device (ECU) for providing brake pressures, which control valves then provide brake pressure to the brake cylinders of service brakes of the brake system pneumatically as a function of a requested target vehicle acceleration. The provision of brake pressure as a function of the actuation of a brake force regulator or brake value encoder via a brake pedal on the part of the driver is superimposed over the electronically provided pneumatic brake pressure so that, in an automatically controlled vehicle, the driver is also personally able to carry out emergency braking in an emergency and/or can override the electronically provided brake pressure.

The disadvantage with previous solutions in known vehicles, in particular automatically controlled utility vehicles, having pneumatic brake systems is that, if the electronic control of the control valves fails, there is no electronically controllable fallback level. The pneumatic fallback level of a conventional brake system only functions when the driver also actuates the brake pedal. A further secondary brake system in the vehicle, for example a parking brake system, is likewise only active when the driver intervenes to thereby brake the vehicle. However, in an automatically controlled vehicle, this is generally not the case, in particular when the driver is not in the vehicle or seated in the driver's seat or the driver is not paying attention or is otherwise occupied.

DE 197 50 392 A1 discloses a brake control for a rear axle having a relay valve as the control valve, an electronically controlled proportional valve and a pneumatic brake force regulator. The proportional valve and the brake force regulator are connected to the relay valve via pneumatic control inputs and transmit a certain control pressure to the control input of the relay valve. The relay valve in turn provides the higher of the two control pressures proportionally as brake pressure to the brake cylinders of the service brakes of the rear axle. A brake valve is furthermore provided, whereof the position is dependent on the brake pedal actuation on the part of the driver and which specifies the brake pressure to be provided by the relay valve. To this end, a brake-valve control pressure is transmitted pneumatically to the brake force regulator by the brake valve and, at the same time, electronically, via a control signal, to the proportional valve via control electronics, which valves then provide a corresponding control pressure to the relay valve, wherein, when functioning properly, the control pressure of the brake force regulator is set slightly lower than the control pressure of the electronically controlled proportional valve. In the event of an electronic failure, a fallback level is thereby provided since, if the electronically controlled proportional valve fails or has a fault, the control pressure specified by the brake force regulator is automatically higher and is therefore used for brake pressure control by the relay valve.

DE 28 18 813 C3 describes an arrangement for preventing wheel spin. In this case, upon the activation of the arrangement, a solenoid valve is opened, which releases the operating pressure from a pressure reservoir so that it can be provided to the solenoid regulator valves at the rear wheels via a directional valve. In this case, the solenoid valve is controlled by a comparator in such a way that, in the event of rear wheel spin when driving off, the rear wheels are braked via the solenoid regulator valves and the velocity of the rear wheels is thus adapted to the velocity of the front wheels. If a braking procedure is initiated at the same time, the directional valve is switched in such a way that brake pressure is only conducted from the brake valve to the solenoid regulator valves and a braking of the wheels thereby takes place.

DE 10 2014 013 882 discloses a method for recognizing an unintentional pneumatic activation of a relay valve, wherein the relay valve is provided for actuating the service brakes and receives requests from a brake valve and also requests from a control or regulating system for automatic braking.

U.S. Pat. No. 7,520,572 B2 and EP 1 730 006 B1 disclose a method in which the brake valve can be actuated by an electronic control device in addition to the brake pedal. Accordingly, an electronic brake system is provided, whereof the service brakes are controlled by the brake valve and via an additional relay valve. The brake request can be specified to the brake valve on the one hand via the brake pedal or, independently of this, via a brake valve actuator, which is arranged between the brake pedal and the brake valve. The brake valve actuator is controlled by the electronic control device in that, if a control signal is present for braking the vehicle, a regulating pressure is provided to the brake valve actuator, which is designed for example as a pneumatic valve, so that the brake valve is actuated.

U.S. Pat. No. 6,659,244 B2 discloses a possible brake valve actuator for U.S. Pat. No. 7,520,572 B2 or EP 1 730 006 B1, which is arranged between the brake pedal and the brake valve and is designed as a pneumatic actuator having a piston. If a regulating pressure from the electronic control device is present, the pneumatic actuator holds the piston rod of the brake valve in its actuated position, irrespective of the position of the brake pedal, for example to enable pre-trip functionality to be provided in the stationary state of the vehicle.

EP 1 530 529 B1 discloses a pressure regulating module for a pneumatic brake system of a vehicle. In this, it is provided that a relay valve controlling the service brake is controlled via a directional valve, wherein the control takes place via an ABS control device as a function of wheel slip occurring. Provision is furthermore made for the use of such an arrangement in a traction control system in that a further directional valve is connected upstream, which, in the event of traction slip, connects the compressed-air connection of the directional valve to a pressure reservoir so that the pressure at the service brakes can also be increased via the relay valve.

DE 10 2010 050 578 A1 discloses a brake system in which a brake request is specified via a brake valve or a brake pedal device. This brake request is converted into an electronic signal in a control device and a control valve, which provides the brake pressure to the service brakes, is controlled by the electronic signal. If the electronics fail, the control valve is controlled pneumatically in the redundancy situation via pneumatic lines of the service brake valve and brake pressure is thereby provided to the service brakes. In this case, the control valve has a plurality of solenoid valves and a relay valve. Depending on the desired function, the solenoid valves can increase, maintain or reduce the brake pressure provided by the relay valve to the service brakes via the control pressure in that a current is applied to the respective solenoid valve.

DE 10 2013 015 949 A1 describes a brake system for cornering assistance, wherein provision is made for providing brake pressure to service brakes of the brake system by means of an electronically controlled manifold valve, wherein brake pressure is then also provided if there is no brake request by a first brake valve as the brake value encoder. In this case, the manifold valve and the first brake valve are connected via a shuttle valve to a relay valve, which provides the brake pressure to the service brakes. In this case, the shuttle valve only provides the higher of the two pressures from the first brake valve or the shuttle valve to the relay valve so that the electronic request of the manifold valve can be overridden by the first brake valve.

DE 10 2014 006 615 A1 describes a pneumatic brake system having a service brake device which has a brake value encoder for electronically outputting a brake request for example as a function of a brake pedal actuation. A parking brake device is furthermore provided, which, in particular, can actuate the service brakes of the rear axle. The brake value encoder of the service brake device is connected to the parking brake device via a data line so that, in the event of an electronic defect in the service brake device, braking requested by the driver can also take place via the parking brake device on the rear axle. This provides a redundancy.

SUMMARY

In an embodiment, the present invention provides a method for automatic electronic control of a brake system in a vehicle. The method includes reading a request signal for automatic electronic control of actuators in the vehicle. At least one of the actuators has an influence on actual longitudinal vehicle dynamics of the vehicle, and requests that are to be implemented by the actuators for realizing automatically requested target longitudinal vehicle dynamics are transmitted via the request signal. The method further includes plausibility-checking the request signal to establish whether the requests are, or can be, implemented completely or without error by the actuators, taking into account a tolerance, and determining a correction deceleration and/or a correction velocity if the implementation of at least one of the requests has not taken place, or cannot take place, completely or without error, taking into account the tolerance, in order to specify corrective braking. The correction deceleration and/or the correction velocity are stipulated as a function of the at least one of the requests which has not taken place, or cannot take place, completely or without error. Finally, the method includes requesting the corrective braking of the vehicle as a function of the correction deceleration and/or the correction velocity for bringing the vehicle into a safe state.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide methods for the automatic electronic regulation of a brake system and electronically regulated controls for a brake system, which ensure safe and reliable redundant braking, in particular in an automatically controllable vehicle, at little expense.

According to embodiments of the invention, in electronically controllable brake systems having an electronically and/or pneumatically controllable redundancy, which is enabled by a redundancy arrangement, a monitoring device is provided, which is designed to plausibility-check a request signal, which is specified for automatic operation of a vehicle, in particular a utility vehicle, and transmits automatically specified requests to actuators of the vehicle, for example a target vehicle acceleration, a target vehicle velocity and/or a target vehicle direction. If it is concluded from the plausibility check that at least one of the automatically specified requests is not implemented completely or without error, or cannot be implemented completely or without error, i.e. a current actual state relating to the longitudinal dynamics of the vehicle itself deviates from a target state resulting from the automatically specified requests, taking into account a tolerance, a correction signal, which conveys for example a correction deceleration and/or a correction velocity, is sent to a control of the redundancy arrangement so that this can then request electronic-pneumatically controlled redundant braking, for example, which corresponds to the correction signal.

The advantage can thereby be achieved that, in an automatically controlled vehicle, a redundant or corrective braking intervention via the redundancy arrangement can take place, taking into account a plausibility-checked request. The reliability of the automatic control of the vehicle can thereby be achieved, since, as a result of the plausibility check, incorrect implementation of an automatically specified request can be detected and consequently addressed via redundant braking in that the vehicle is brought into the stationary state, for example, or braked to a safe velocity at which the vehicle can be moved into a safe position. The corrective braking intervention therefore means that the vehicle is, or can be, brought into a safe state.

As a result of the tolerance included in the plausibility check, it is for example taken into account that, when determining the current actual state with regard to the longitudinal dynamics of the vehicle itself, measurement noise, control deviations, traction slip or brake slip without wheel spin or locking of the wheels or other variables influencing the driving behavior in a manner not critical to safety are also recognized, which are not specified by the request signal and can therefore result in a slight deviation.

To this end, the brake system has, in particular, a first control device for realizing braking in normal automatic operation, i.e. outside the redundancy situation, and a second control device controlling the redundancy arrangement, via which braking can be realized in particular in the redundancy situation. A third control device is furthermore provided in the vehicle, which is associated with a controlled electronic regulating system designed to control the vehicle automatically via the request signal. The automatic control in this case takes place in particular as a function of a vehicle movement planned at the third control device, in particular taking into account the current vehicle state and environment recognition, wherein, for automatic control by means of the request signal, different actuators, for example the wheel brakes in the brake system, a sustained-action brake (retarder), an engine, a gear unit, or the steering can be controlled to implement the planned vehicle movement in the appropriate manner.

Further actuators can also be provided in the vehicle, which can be controlled automatically to alter the dynamics of the vehicle and therefore implement the vehicle movement. According to embodiments of the invention, provision is made here to monitor or plausibility-check at least those requests to the actuators which serve to influence or co-determine the actual state of the vehicle with regard to the longitudinal dynamics, referred to below as actual longitudinal vehicle dynamics.

In this case, when plausibility-checking the requests, provision is preferably made to take into account in particular those longitudinal dynamics requests which realize a positive actual vehicle acceleration and/or set an actual vehicle direction. That is to say, it is plausibility-checked in particular whether the gear unit and the engine are controlled without error and the automatically specified requests are implemented correctly by these actuators. It can thus advantageously be achieved that it is possible to react to an error in the drive system with which the vehicle can be automatically moved forwards or in reverse. The reliability of the automatic control of the drive of the vehicle increases.

However, it can additionally also be provided for requests which realize braking, i.e. those requests for realizing a negative actual vehicle acceleration, for example requests to the brake system or a secondary brake system, to be taken into account.

A request which does not influence the longitudinal dynamics of the vehicle itself, for example a target vehicle steering angle, can preferably additionally also be plausibility-checked. Therefore, it is advantageously possible to react to incorrect implementation of an automatically specified steering of the vehicle via a braking intervention, wherein a failure or defect in the steering is preferably detected in an on-board diagnostic procedure and reported to the monitoring device.

To control the wheel brakes in the automatic operation outside the redundancy situation, i.e. in normal automatic operation, as a function of the target vehicle acceleration and/or the target vehicle velocity electronically transmitted via the request signal, at least one control valve, for example an axle modulator or a relay valve, is controlled by the first control device, which control valve controls the wheel brakes of at least one vehicle axle pneumatically via a wheel-brake control pressure if a reduction in the target vehicle speed, i.e. braking, is required to implement the automatically specified request. Furthermore, in normal automatic operation, as a function of the automatically specified request, electronic control of a secondary brake system, preferably an independent brake circuit controlled by a parking brake valve, can also be provided, by means of which braking or maintaining a stationary state can be realized. In this case, by means of the parking brake valve, wheel brakes are preferably controlled by a combined service-brake and spring-energy cylinder.

In the event of a failure or a defect in the first control device or in the event of an incorrect implementation of the automatically specified request signal, it is instead possible for an electronic-pneumatically controlled redundant braking to take place via the second control device in the redundancy arrangement so that electronic-pneumatic fallback levels or redundancies can thus be provided. To this end, the second control device controls at least one redundancy valve in the redundancy arrangement electronically as a function of the request signal or the correction signal.

The at least one redundancy valve here can be designed as a pressure control valve, for example, which outputs a control-valve control pressure for pneumatically controlling the at least one control valve as a function of the automatic request signal or the correction signal. There is therefore a switch from an electronic control of the control valve in normal automatic operation to a pneumatic control of the control valve in the redundancy situation.

Alternatively, the parking brake valve can also be used as a redundancy valve, which is therefore likewise part of the redundancy arrangement. The parking brake valve can therefore be used both for redundant braking carried out by the redundancy arrangement and for braking in normal automatic operation, wherein, in both cases, the second control device preferably assumes the electronic control. That is to say the second control device has a dual function in that, in the redundancy situation, it controls the parking brake valve as a function of the automatic requests or as a function of the correction signal and, in normal automatic operation, for example, as a function of a parking brake function specified by the driver or automatically. Components which are present in the vehicle can advantageously thus be used for a plurality of functions so that costs are reduced.

A combination of the two can also be provided so that redundant braking can take place via the parking brake valve and, at the same time, via the control valve. The redundancy arrangement than has in particular the second control device and two redundancy valves. It can thus advantageously be ensured that, even in the event of a defect of the control valves, redundant braking can be realized since an independent brake circuit is controlled via the parking brake valve.

The fallback level or redundancy relating to an incorrect implementation of the automatically specified request signal is controlled by the monitoring device, wherein this can revert to the redundant control, present in the vehicle, of the wheel brakes by the redundancy arrangement via the correction signal. The monitoring device is preferably connected between the third control device and the second control device in the transmission path of the request signal so that the request signal always reaches the second control device via the monitoring device. If it is concluded from the plausibility-check at the monitoring device that the request signal is error-free, this is transmitted, unaltered, to the second control device by the monitoring device. On the other hand, if the request signal is incorrect, the correction signal is transmitted to the second control device.

To establish whether incorrect or incomplete implementation of the automatically specified request signal is present, i.e. whether current actual longitudinal vehicle dynamics of the vehicle itself deviate from target longitudinal vehicle dynamics resulting from the automatically specified requests, taking into account the tolerance, or whether the automatically specified requests can be implemented completely without error, a plurality of options are provided:

On the one hand, a plausibility-check of the requests can take place in that, upon transmitting the target vehicle acceleration and the target vehicle velocity via the request signal, the time shift of the target vehicle velocity, i.e. the mathematical derivation, is compared to the target vehicle acceleration. If the target vehicle acceleration deviates from the derivation by a tolerance, it can be concluded that the automatic request cannot be implemented without error since the two would have to be identical. That is to say either the target vehicle acceleration of the target vehicle velocity can be implemented without error via the respective actuators. For the other request in each case, the implementation is inevitably incorrect.

The requests transmitted via the request signal can furthermore contain jumps, i.e. a target vehicle velocity, a target vehicle steering angle and/or a target vehicle direction can proceed non-monotonously time-wise, i.e. owing to the jump, a very rapid change in the vehicle dynamics is requested whereof the implementation is physically impossible. In the case of the target vehicle direction, a non-monotonous progression can arise in particular in that the target vehicle direction is switched from "forwards" to "reverse" without requesting an intermediate "stationary state" of the vehicle via the target vehicle direction. The actual longitudinal vehicle dynamics therefore necessarily deviate from the request which cannot be implemented, i.e. the target longitudinal vehicle dynamics. This can indicate an error in the calculation of the respective requests or in the transmission, with which reliable automatic control cannot be ensured. Also in the case of the target vehicle acceleration, jumps can occur as a result of a time-wise non-monotonous progression, which cause a jolt. This can also be detected and taken into account accordingly so that the jolt does not cause a safety-critical state of the vehicle or alarm the driver.

To include the current actual longitudinal vehicle dynamics, a variable describing the current actual longitudinal vehicle dynamics is used by the monitoring device, wherein this variable characterizes the current movement of the vehicle itself in a longitudinal direction. This variable can be for example an actual vehicle velocity and/or an actual vehicle acceleration and/or an actual vehicle direction, which indicates the velocity or the acceleration of the vehicle itself in the longitudinal direction of the movement direction of the vehicle, i.e. forwards, stationary or reverse. The actual vehicle direction here is preferably a consequence of whether the actual vehicle velocity is positive or negative.

The actual vehicle velocity and the actual vehicle acceleration are identified by any redundant velocity sensor, for example one or more wheel speed sensors at the wheels of a non-driven vehicle axle, preferably the front axle, and/or by a redundant acceleration sensor when travelling. The velocity sensor is preferably designed in such a way that an actual vehicle direction can be identified from its measurement values. In addition, the actual vehicle velocity and the actual vehicle acceleration can advantageously be plausibility-checked using values from further sensors present in the vehicle to increase the reliability.

An incorrect or incomplete implementation of the automatic request can now be detected in that the actual longitudinal vehicle dynamics do not correspond to the target longitudinal vehicle dynamics, i.e. in that the actual vehicle acceleration deviates from the target vehicle acceleration and/or the actual vehicle velocity deviates from the target vehicle velocity and/or the actual vehicle direction deviates from the target vehicle direction.

An incorrect implementation can furthermore be detected as a result of whether the integral of the actually present actual vehicle velocity, observed over a time period of for example 500 ms to 3 s, corresponds to an automatically specified vehicle trajectory, i.e. the future travel distance for this time period.

A deviation of the actual longitudinal vehicle dynamics from the target longitudinal vehicle dynamics can occur for example in that at least one of the actuators or sensors in the vehicle or a controller for these actuators or sensors is defective or is not controlled correctly, i.e. for example the gear unit, a wheel brake, the sustained-action brake, the steering or the engine are not controlled in the manner specified by the automatic requests via the request signal. In this case, some of the actuators regulate their corresponding variables in a regulating circuit as a function of sensor signals, wherein it is checked as a function of the sensor signal as to what extent a request has already been implemented by the respective actuator and to what extent readjustment is still necessary. Therefore, incorrect implementation by the actuator associated with a sensor can also occur if this sensor fails.

A failure or a defect in individual actuators or sensors or individual control devices can be reported to the monitoring device via a diagnostic signal by the corresponding controller of the respective actuator or sensor or by the respective control device so that this monitoring device can take this failure into account accordingly when outputting the correction signal. To this end, the individual controllers or the control device carry out an on-board diagnostic procedure. If an error is detected, which cannot be eliminated or compensated itself by the respective controller or the respective control device, a corresponding correction signal is output so that the redundancy arrangement can carry out a braking intervention to bring the vehicle into a safe state.

Deviations can furthermore result from the vehicle moving in the wrong direction when starting, i.e. the actual vehicle direction differs from the target vehicle direction or the actual vehicle velocity has a different sign from the target vehicle velocity, for example because the gear unit has been controlled incorrectly. Or the vehicle is automatically started unintentionally or is rolling unintentionally on a slope, i.e. a target vehicle velocity of zero is not maintained because the parking brake valve could not be controlled as requested, for example.

An incorrect or incomplete implementation can arise as a result of incorrect transmission of the request signal, for example via a CAN bus. If, for example, a failure or a defect in the signal transmission by the third control device is present, for example a CAN error, it is not possible to ensure reliable automatic control of the vehicle. A failure or a defect or an error in the transmission can be detected for example in that the request signal does not arrive at the first control device, the second control device, the monitoring device or the respective actuators as expected, for example because the requests received contain gaps and therefore do not proceed monotonously or the value ranges of the signals are invalid or their check sum is invalid or the requests are transmitted too quickly or too slowly (timing).

Different causes for an incorrect implementation of the requests can therefore be present, wherein the identified correction signal also varies as a function of the causes.

If it is somehow established that an incorrect implementation of the automatically specified requests is present, for example as a result of a failure or a defect in the third control device, a transmission error via the CAN bus or an error or defect at the actuators or sensor, and it is therefore not possible to ensure that the vehicle can be safely controlled by the request signal, a correction signal with a correction deceleration is output, by means of which the redundancy arrangement brings the vehicle safely into a stationary state with regard to the applicable safety aspects via the at least one redundancy valve. To this end, for example, a correction deceleration of between $-2.5$ m/s$^2$ and $-4$ m/s$^2$, for example of $-3.5$ m/s$^2$, can be specified so that the vehicle can be braked to the stationary state quickly and safely over a short stopping distance without thereby endangering the following traffic, for example as a result of rear end collisions or causing instability of the vehicle itself.

In addition, an engine shut-off device can be provided, which, in the case of an internal combustion engine for example, interrupts the fuel supply so that the engine is stalled and therefore does not work against the required braking to the stationary state or positively accelerate the vehicle further in the event of a failure of the brakes. In the case of an electric drive, the energy supply can be controlled separately in a corresponding manner by the engine shut-off device in order to shut off the engine.

If a deviation between the target vehicle acceleration and the derivation of the target vehicle velocity is present, a correction signal can be output which converts the more conservative of the two requests into braking, i.e. the request which is selected results in gentler braking.

If an error is detected at one of the actuators, which can realize an incorrect implementation of the requests, for example failure of an ESC (Electronic Stability Control), but with which safe automatic operation of the vehicle can still be ensured, a correction velocity is output with which the vehicle can be controlled safely and reliably, for example a correction velocity of 60 km/h of the ESC.

On the other hand, if the expected target longitudinal vehicle dynamics deviate from the currently identified actual longitudinal vehicle dynamics and this deviation can be compensated safely and reliably by a corrective braking intervention, a correction deceleration and/or a correction velocity which can realize this compensation is determined by the monitoring device. To this end, a correction deceleration of less than $-4$ m/s$^2$ can also be stipulated, for example to achieve as short a braking distance as possible, for example for emergency braking before an obstacle.

This compensating braking is preferably only carried out if ABS control is not active in the automatically controlled brake system, i.e. an ABS control intervention has not been detected. The safety and the reliability of the corrective braking intervention can thus be increased since the risk of instability triggered by the redundant braking is reduced.

The correction deceleration or the correction velocity can additionally also take place taking into account longitudinal dynamics limit values of the vehicle, for example a maximum velocity and/or a maximum acceleration, so that it is advantageously possible to ensure safe automatic control with which, for example, despite an increasing target vehicle velocity, the vehicle is not positively accelerated beyond the maximum velocity.

In addition to the corrective braking intervention, a warning signal or a warning light for the driver and a brake light or a hazard warning light for the following traffic can also be controlled via the redundancy arrangement so that both the driver and the following traffic can be prepared for corrective braking owing to an incorrect automatic implementation.

The redundancy arrangement, in particular the second redundancy device, or the monitoring device can advantageously additionally be designed to detect a brake slip situation as a result of redundant braking and to then switch from a continuous control of the redundancy valve to a pulsed control to prevent instability of the vehicle in the redundancy situation and restricted steerability.

A monitoring device can preferably be part of the second control device arranged in the redundancy arrangement, wherein, to this end, the monitoring device can contain software logic executed at the control device. However, the monitoring device can also be designed to be structurally separate from the second control device.

Therefore, a monitoring device having software logic can be advantageously provided in a simple manner, which software logic independently decides at which point in time redundant braking intervention should take place because the automatically specified request is, or cannot be, implemented in the vehicle in any way by the actuators. The software logic can therefore output corrected requests for the redundancy arrangement, so that this can carry out a braking intervention, wherein this intervention is comparable to a manual intervention on the part of a driver in an automatically controlled vehicle.

The driver will intervene manually by actuating a foot brake pedal and thereby possibly override the automatic request if the driver establishes, for example, that the velocity limit has been exceeded, one of the actuators, for example the automatic steering, no longer functions, the vehicle is started unintentionally, the vehicle is travelling in the wrong direction, a warning light is activated, or there is a deviation from the planned path, etc. The driver therefore carries out a braking intervention to ensure that the vehicle travels safely as a result of the error being detected by the driver.

If the automatically controlled vehicle is travelling without a driver or the driver is not paying attention or is otherwise occupied or is not seated in the driver's seat, the reaction on the part of the driver can advantageously be effected automatically as a result of the monitoring device and the safety can thereby be increased in that, in the above-mentioned situations, instead of the driver, the software logic of the monitoring device can detect an error, classify it and intervene in the braking in the appropriate manner.

It is additionally advantageously provided that the driver can still intervene in the corrected braking by actuating the brake pedal, for example in an emergency braking situation or when the driver detects that the braking by the automatic control is too gentle, for example in relation to the traffic ahead, or that the vehicle is unstable, and can therefore override both the automatic request output by the first control device and the request corrected by the monitoring device in order to reduce the risk of an accident.

It is advantageously additionally provided that the driver or another qualified person can output an emergency signal to the monitoring device directly in order to bring the vehicle into the stationary state via the redundancy arrangement, for example in an emergency braking situation. The monitoring device then provides a corresponding correction signal which realizes this stationary state.

To also ensure the functionality of the monitoring device in the event of a failure or a defect in the normal operation of the vehicle, i.e. in the redundancy situation, the monitoring device can be connected to an additional energy supply, which also supplies energy to the second control device and/or a redundant steering, for example, so that it is still possible to realize safe and reliable braking and/or steering in the redundancy situation.

The monitoring device is preferably also able to take into account whether the vehicle is travelling with a trailer, wherein, to this end, redundant trailer detection can also be provided.

Figure 1:
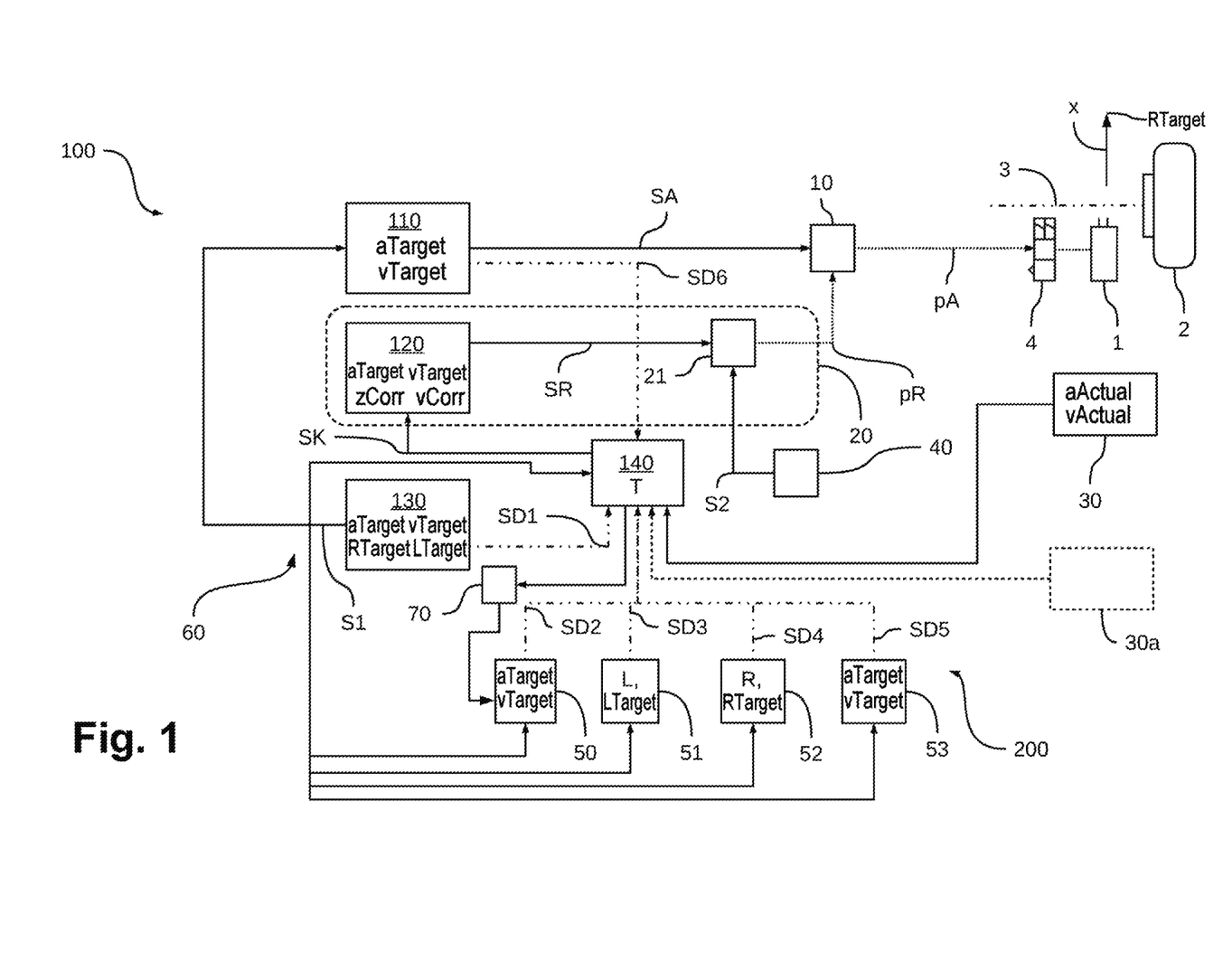
FIG. 1 is a block diagram illustrating a brake system according to an embodiment of the invention with a monitoring device.

A detail of a brake system 100 of a vehicle 200 is illustrated as a block diagram in the embodiment according to FIG. 1. Accordingly, the brake system 100 has a first control device 110, a second control device 120 and a monitoring device 140. The brake system 100 is designed to brake the vehicle 200 via wheel brakes 1, which are each associated with wheels 2 of a vehicle axle 3 and upstream of which electronically controllable ABS brake valves 4 are optionally connected. For the sake of simplicity, only a right front wheel 2 of a front axle 3 of the vehicle 200 is illustrated way of example in the embodiment according to FIG. 1. Further wheels can be constructed in a corresponding manner with or without ABS brake valves 4.

A third control device 130 is furthermore illustrated, which is associated with a regulating system of the vehicle 200, which is designed to control the vehicle 200 automatically, for example as a function of a planned vehicle movement F, in particular taking into account the current vehicle state and environment recognition. The automatic control takes place here via actuators in the vehicle 200, i.e. in particular the wheel brakes 1 of the brake system 100, an engine 50, the steering 51, with which a steering angle L of the vehicle 200 can be specified, a gear unit 52, with which, in particular, a travel direction R of the vehicle 200 can be set, and a sustained-action brake (retarder) 53 via which braking can likewise be realized.

To this end, a request signal S1 can be specified by the third control device 130, for example via a CAN bus 60, as a function of which the respective actuators 1, 50, 51, 52 53 are controlled. In this case, the request signal S1 is identified as a function of the planned vehicle movement F, wherein, as a function of the current position of the vehicle 200, the route ahead, e.g. a distance and elevation profile, are for example detected via environment recognition and requests are then identified for the individual actuators 1, 50, 51, 52, 53 in the vehicle 200 with which the planned vehicle movement F can be accomplished. The requests can be in particular a target vehicle velocity vTarget, a target vehicle acceleration aTarget, a target vehicle steering angle LTarget and a target vehicle direction RTarget, which are output via the request signal S1 and received by the corresponding actuators 1, 50, 51, 52, 53 or their controllers via the CAN bus 60 in order to implement the respectively relevant request aTarget, vTarget, LTarget, RTarget in the appropriate manner.

Therefore, the engine 50 realizes a positive acceleration of the vehicle 200 with the specified target vehicle acceleration aTarget on the specified target vehicle velocity vTarget, or the brake system 100 or the wheel brakes 1 and/or the sustained-action brake 53 realizes a corresponding negative acceleration with the specified target vehicle acceleration aTarget on the specified target vehicle velocity vTarget. The target vehicle steering angle LTarget can be set via the steering 51 in order to steer the vehicle 200 in a certain direction, and a target vehicle direction RTarget can be set via the gear unit 52 in order to move the vehicle 200 forwards or in reverse.

In this case, the brake system 100 according to this embodiment is controlled electronic-pneumatically in normal automatic operation via the first control device 110 in that, as a function of the request signal S1, the wheel brakes 1 are supplied with a corresponding wheel-brake brake pressure pA when a negative acceleration is desired. To this end, as a function of the specified target vehicle acceleration aTarget and/or the target vehicle velocity vTarget, the first control device 110 outputs an electronic control-valve control signal SA to a control valve 10, for example a relay valve associated with a vehicle axle 3 or an axle modulator. This provides a corresponding wheel-brake brake pressure pA at the wheel brakes 1 for realizing the specified request, i.e. the target vehicle acceleration aTarget or the target vehicle velocity vTarget.

In parallel thereto, a redundancy arrangement 20 having the second control device 120 is arranged in the brake system 100, which control device, according to this embodiment, in particular as a function of the specified target vehicle acceleration aTarget and/or the target vehicle velocity vTarget, can transmit a redundancy signal SR electronically to a first redundancy valve 21, which provides a corresponding redundancy control pressure pR pneumatically to the control valve 10. As a result of the pneumatic control, the control valve 10 generates a corresponding wheel-brake brake pressure pA for the wheel brakes 1 for braking the vehicle 200. By means of the redundancy arrangement 20, a redundant control of the wheel brakes 1 is possible in two respects:

On the one hand, in the event of a failure of the electronics in the first control device 110, for example, it is possible to revert to an electronic-pneumatic control via the redundancy arrangement 20 so that there is a switch from an electronic control of the control valve 10 to a pneumatic control of the control valve 10. A fallback level can thus be provided. On the other hand, a corrective intervention via the monitoring device 140 in the brake request specified by the first control device 110 or by the second control device 120 as a result of the request signal S1 is possible.

To this end, the monitoring device 140 evaluates and plausibility-checks the request aTarget, vTarget, LTarget, RTarget output via the request signal S1. In this case, the monitoring device 140 establishes whether the request signal S1 or at least one of the requests aTarget, vTarget, LTarget, RTarget transmitted thereby is, or can be, implemented correctly, i.e. without error and completely, by the actuators 1, 50, 51, 52, 53, i.e. whether an actual state, in particular the actual longitudinal vehicle dynamics DActual, deviates from the target longitudinal vehicle dynamics DTarget characterized by the requests aTarget, vTarget, LTarget, RTarget, taking into account a tolerance T. If this is not the case, the monitoring device 140 provides a correction signal SK to the second control device 120, wherein the correction signal SK contains a correction deceleration zCorr and/or a correction velocity vCorr. By means of the correction deceleration zCorr and/or the correction velocity vCorr, the redundancy arrangement 20 conveys a corrective request with which the incorrect or incomplete implementation of the request signal S1 is compensated or with which the incorrect or incomplete implementation should be addressed, wherein this takes place through an intervention in the wheel brakes 1 via the redundancy arrangement 20.

To this end, the redundancy signal SR is overwritten with the correction deceleration zCorr and/or the correction velocity vCorr if redundant braking has already been requested by the second control device 120 as a result of the request signal S1. Therefore, the redundancy valve 21 is controlled as a function of the correction deceleration zCorr and/or the correction velocity vCorr and the control valve 10 provides a wheel-brake control pressure pA corresponding to the pneumatically specified redundancy control pressure pR.

Whether the request signal S1 has been implemented incorrectly or incompletely, or cannot be implemented correctly or completely, can be detected here for example in that a time shift in a time period dt of the target vehicle velocity vTarget, i.e. the mathematical derivation thereof, is compared to the target vehicle acceleration aTarget. If the target vehicle acceleration aTarget deviates from the derivation, it can be concluded that at least one of the requests vTarget, aTarget has been implemented incorrectly since the two have to approximately identical.

The requests aTarget, vTarget, RTarget, LTarget transmitted via the request signal S1 can furthermore contain jumps, i.e. the target vehicle acceleration aTarget, the target vehicle velocity vTarget, the target vehicle steering angle LTarget and the target vehicle direction RTarget can proceed non-monotonously time-wise, which, owing to the jumps, results in a physically impossible request to the actuators 1, 50, 51, 52, 53 or a jolt in the case of a non-monotonous target vehicle acceleration aTarget, which therefore cannot be implemented thereby. This can in particular indicate an error in the calculation of the requests aTarget, vTarget, RTarget, LTarget or an incorrect transmission with which reliable automatic control cannot be ensured.

In addition or alternatively, provision can also be made to plausibility-check whether the transmission of the request signal S1 via the CAN bus 60 is incorrect and an implementation of the requests has consequently failed, or will fail. For example, if failure or a defect is present in the signal transmission by the third control device 130, for example a CAN error, reliable control via the request signal S1 cannot be ensured. A failure or a defect or an error in the transmission can be detected for example in that a defect is reported by the third control device 130 via a first diagnostic signal S1 or the request signal S1 does not arrive at the second control device 120 as expected, for example because requests aTarget, vTarget, RTarget, LTarget which are each received by the second control device 120 contain gaps. The diagnostic signal SD1 here is generated for example as a function of an on-board diagnostic procedure.

The current actual longitudinal vehicle dynamics DActual of the vehicle 200 itself are furthermore monitored and the request signals S1 are thereby plausibility-checked. To this end, the monitoring device 140 uses a variable describing the current actual longitudinal vehicle dynamics DActual, wherein this variable characterizes the current movement of the vehicle 200 itself in a longitudinal direction x. This variable can be for example an actual vehicle velocity vActual and/or an actual vehicle acceleration aActual and/or an actual vehicle direction RActual, which indicates the velocity or the deceleration of the vehicle itself 200 or the movement direction, i.e. forwards, stationary or reverse. The actual vehicle direction RActual is preferably indicated here by the sign of the actual vehicle velocity.

According to one variant, it is provided to only plausibility-check those requests vTarget, aTarget, RTarget which relate to a positive target vehicle acceleration aTarget, i.e. to establish whether the requests vTarget, aTarget, RTarget to be implemented by the drive, i.e. in particular by the engine 50 or the gear unit 52, are, or can be, also implemented without error and completely and, if not, to carry out a corrective braking intervention.

The actual vehicle velocity vActual and the actual vehicle acceleration aActual are identified here by a redundant velocity sensor 30, for example a redundant wheel speed sensor at the wheels 2 of the non-driven front axle 3. These identified values aActual, vActual can be plausibility-checked by further sensors 30a in the vehicle 200 to increase the reliability of the values. To enable the actual vehicle direction RActual to be obtained from the measurement of the redundant velocity sensor 30, this latter is designed to output the actual vehicle velocity vActual together with the direction, for example via the sign.

An incorrect implementation of the request signal S1 as a function of the longitudinal vehicle dynamics DActual can then be detected for example in that expected target longitudinal vehicle dynamics DTarget resulting from the requested target vehicle acceleration aTarget and/or the target vehicle velocity vTarget and/or the target vehicle direction RTarget deviate from the current actual vehicle acceleration aActual or actual vehicle velocity vActual or actual vehicle direction RActual.

This can additionally also take place taking into account longitudinal dynamics limit values DLimit of the vehicle 200, for example a maximum velocity vMax or a maximum acceleration aMax, so that safe automatic control can advantageously be ensured.

A deviation of the actual longitudinal vehicle dynamics DActual from the target longitudinal vehicle dynamics DTarget can occur for example in that at least one of the actuators 1, 50, 51, 52, 53 in the vehicle 200—or a control of these actuators 1, 50, 51, 52, 53—is defective, i.e. for example the gear unit 52, one of the wheel brakes 1, the steering 51, the sustained-action brake 53 and/or the engine 50 cannot be controlled correctly. That is to say the requests aTarget, vTarget, RTarget, LTarget which are transmitted via the request signal S1 and are to be implemented by the actuators 1, 50, 51, 52, 53 might not be implemented correctly. Such a failure of individual components can be reported to the monitoring device 140 by the actuators 1, 50, 51, 52, 53 or their controllers via diagnostic signals SD2, SD3, SD4, SD5 so that this monitoring device can take the failure into account accordingly. The diagnostic signals SD2, SD3, SD4, SD5 here are generated by the corresponding actuators 1, 50, 51, 52, 53 or their controllers in an on-board diagnostic procedure in which the functionality is checked. If it is established that a detected defect cannot be compensated or eliminated itself, this is output to the monitoring device 140 via the corresponding diagnostic signal SD2, SD3, SD5, SD5.

The first control device 100 can also convey such a diagnostic signal SD6 resulting from an on-board diagnostic procedure to the monitoring device 140 so that this can carry out a redundant intervention via the redundancy arrangement 20 in the event of a failure, for example if the first control device 110 no longer receives a request signal S1.

Some of the actuators 1, 50, 51, 52, 53 here regulate their corresponding control variables in a regulating circuit as a function of sensor signals from sensors not illustrated here, wherein it is checked as a function of the respective sensor signal as to what extent a request aTarget, vTarget, RTarget, LTarget has already been implemented by the respective actuator 1, 50, 51, 52, 53 and to what extent readjustment is still necessary. Therefore, incorrect implementation by the actuator 1, 50, 51, 52, 53 associated with a sensor can also occur if this sensor fails.

Deviations can furthermore result from the vehicle 200 moving in the wrong direction when starting, i.e. the actual vehicle direction RActual differs from the target vehicle direction RTarget, or the actual vehicle velocity vActual has a different sign from the target vehicle velocity vTarget. Or the vehicle 200 is automatically started unintentionally or is rolling unintentionally on a slope, i.e. a target vehicle velocity vTarget of zero is not maintained.

There can therefore be different causes for an incorrect implementation of the request signal S1, wherein the identified correction signal SK also varies as a function of the causes:

If it is somehow established that an incorrect transmission of the request signal S1 is already present, for example because a failure or defect in the third control device 130, a transmission error in the Can bus 60 or an error at the actuators 1, 50, 51, 52, 53 is present and it is therefore not possible to ensure that the vehicle 200 can be safely controlled by the request signal S1, a correction signal SK with a correction deceleration zCorr is output, by means of which the redundancy arrangement 20 brings the vehicle 200 safely into the stationary state with regard to the applicable safety aspects via the at least one redundancy valve 21 or brakes it to a safe velocity vSafe at which the vehicle 200 can be moved into a safe position. To this end, for example, a correction deceleration zCorr of between $-2.5$ m/s$^2$ and $-4$ m/s$^2$, preferably of $-3.5$ m/s$^2$, can be specified so that the vehicle can be braked to the stationary state or to the safe velocity vSafe quickly and safely, without thereby endangering the following traffic.

In addition, an engine shut-off device 70 can be provided, which by shutting off the fuel supply, stalls the engine 50 so that it does not work against the required braking zCorr to the stationary state or to the safe velocity vSafe or accelerate the vehicle 200 unnecessarily in the event of a failure of the wheel brakes 1.

If the expected target longitudinal vehicle dynamics DTarget deviate from the currently identified actual longitudinal vehicle dynamics DActual and this deviation can be compensated by corrective braking, a corresponding correction deceleration zCorr and/or a correction velocity VCorr, which can realize this compensation, is determined by the monitoring device 140. This preferably takes place taking into account the longitudinal dynamics limit values DLimit for the vehicle itself. To this end, a correction deceleration zCorr of less than $-4$ m/s$^2$ can be stipulated for example to achieve a certain correction velocity vCorr, for example when a maximum velocity vMax of the vehicle 200 is exceeded.

In addition, it can be provided to only realize such compensating braking if an ABS brake slip situation has not been detected by the brake system 100. Instabilities during the redundant braking can thus be prevented.

Therefore, upon establishing an incorrect or incomplete implementation of the request signal S1 or the individual requests aTarget, vTarget, RTarget, LTarget via the correction signal SK, the redundancy arrangement 20 can be controlled accordingly. This control can furthermore take place as a function of a brake slip situation, detected by the second control device 120, resulting from redundantly executed braking by the redundancy arrangement 20. To this end, the second control device 120 can evaluate the data of the redundant velocity sensor 30, for example, or other sensors in the vehicle 200 to establish whether one of the wheels 2 is locking during braking. In this case, it is possible to switch from a continuous control of the respective redundancy valve 21, 22 to a pulsed control of the respective redundancy valve 21, 22.

In addition, the driver can also intervene manually in the braking via a foot brake valve 40, in that a driver signal S2 corresponding to the actuation is output electronically or pneumatically to the redundancy valve 21, which then provides a redundancy control pressure pR corresponding to the driver signal S2 to the control valve 10 for realizing braking by the driver. To this end, the redundancy valve 21 can be designed for example as a select-high valve, which provides the higher of the two brake requests transmitted via the signals S2, SR pneumatically to the control valve 10.

Figure 2:
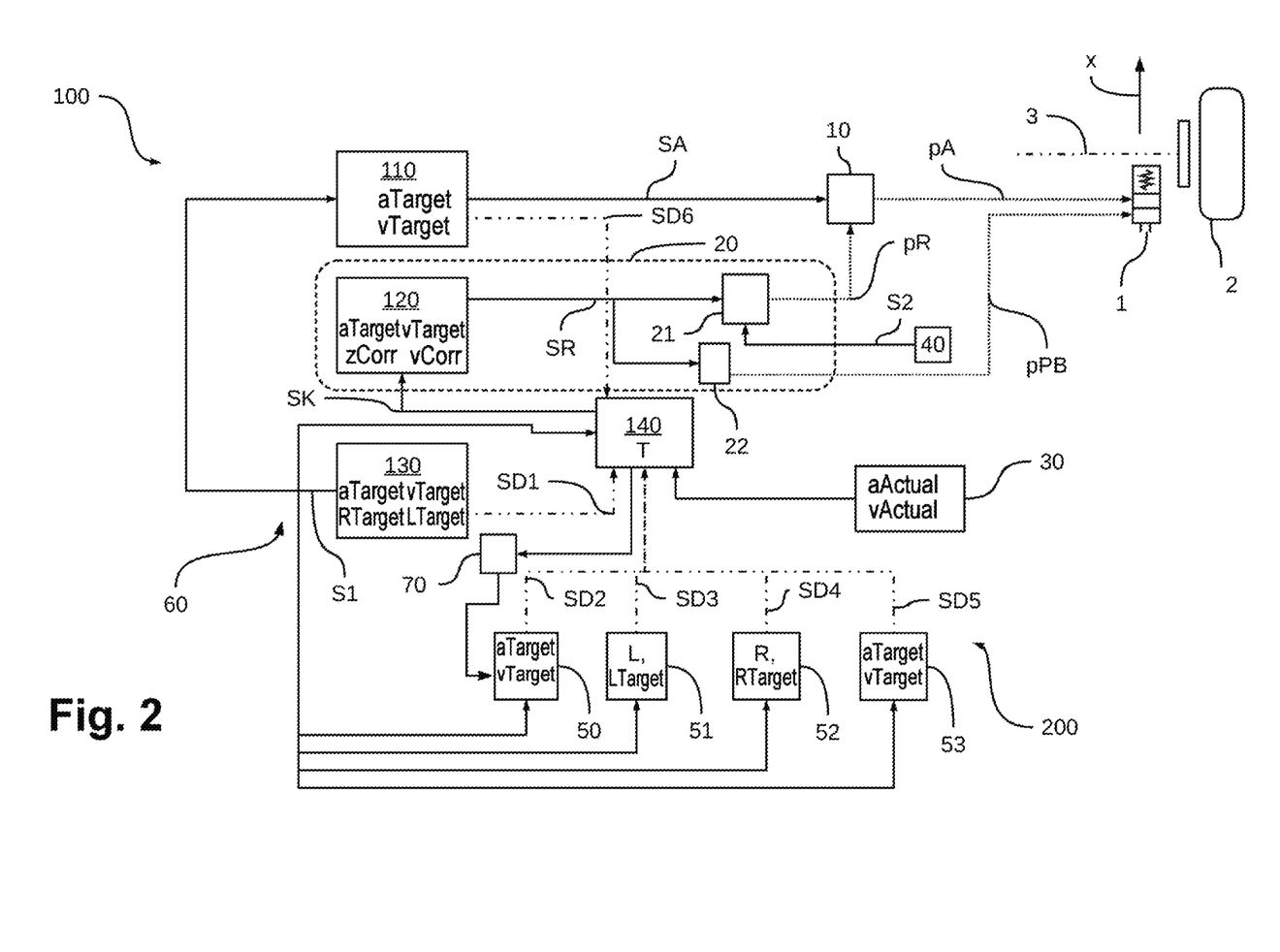
FIG. 2 is a block diagram illustrating a brake system according to a further embodiment of the invention with a monitoring device.

According to FIG. 2, an alternative embodiment of the brake system 100 is provided, in which a second redundancy valve 22, for example a parking brake valve, is arranged in the redundancy arrangement 20. The parking brake valve 22 is likewise electronically controllable by the redundancy signal SR so that this can also be implemented by the parking brake valve 22 in addition to the first redundancy valve 21. According to an alternative embodiment (not illustrated) it is also possible to only provide the parking brake valve 22 and not a first redundancy valve 21.

The parking brake valve 22 is pneumatically connected to a wheel brake 1 on any vehicle axle 3, preferably the driven vehicle axle, wherein this wheel brake 1 is preferably equipped with a combined service-brake and spring-energy cylinder so that this wheel brake 1 can be controlled pneumatically both by a parking-brake brake pressure pPB specified by the parking brake valve 22 and—as described above—by a wheel-brake brake pressure pB provided by the control valve 10.

In normal automatic operation, i.e. if a redundancy situation is not present, the parking brake valve 22 can also be controlled via the second control device 120 in order to implement an automatically specified parking brake request, for example. The second control device 120 and the parking brake valve 22 therefore have a dual function since they can be used both in the redundant braking situation and also in the normal automatic operation.

According to an alternative which is not illustrated, it is also possible to only provide the parking brake valve 22 and to dispense with the first redundancy valve 21. Redundant braking is then implemented only via the parking brake valve 22 and the wheel brakes 1.

Figure 3:
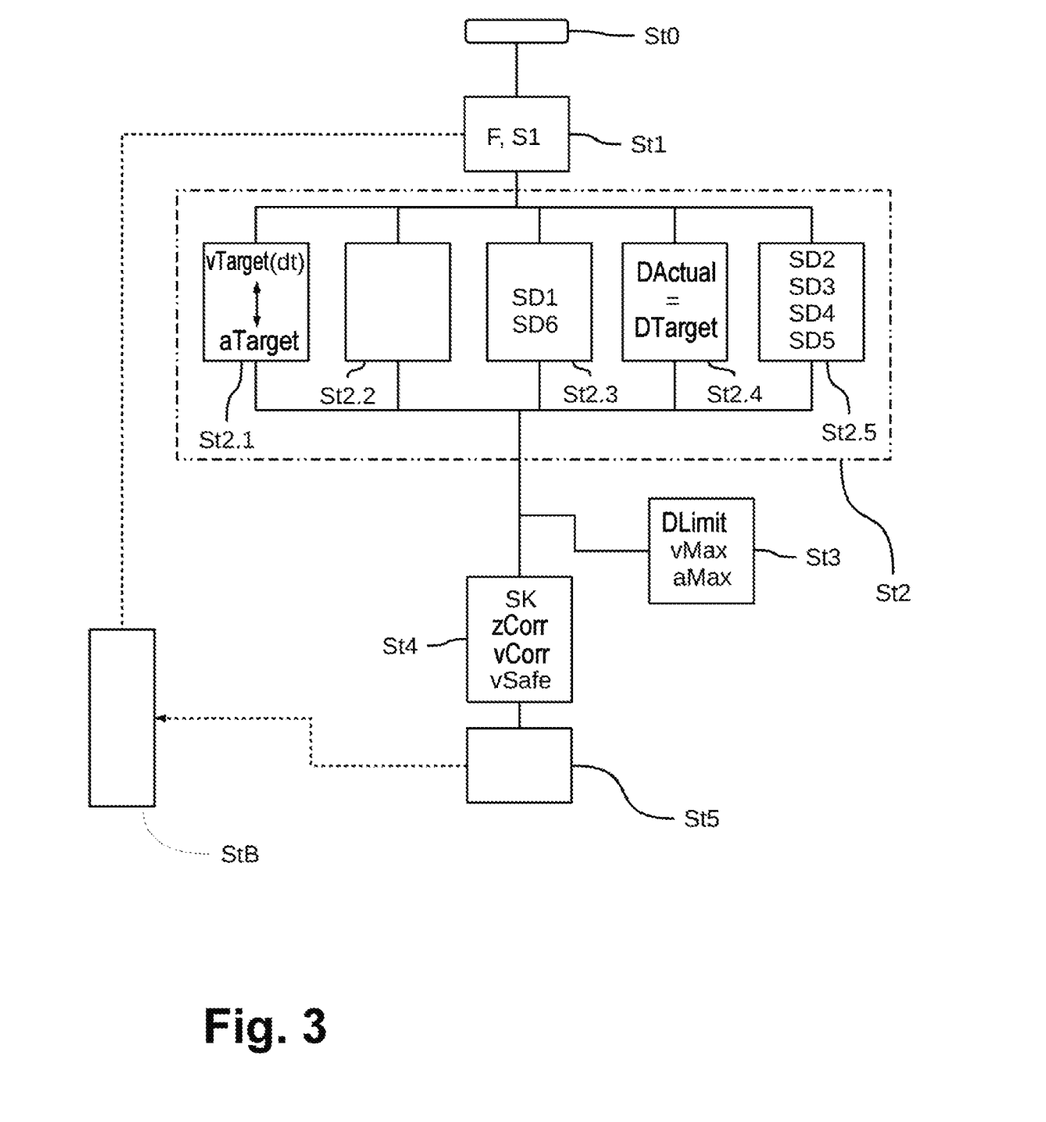
FIG. 3 is a flow chart illustrating a method according to an embodiment of the invention.

According to FIG. 3, a method according to an embodiment of the invention can be executed for example as follows:

In an initial step St0, the brake system 100 is initialized, for example by switching on an ignition or activating the automatic driving mode. In a first step St1, a request signal S1 with requests aTarget, vTarget, RTarget, LTarget is output to the CAN bus 60 by the third control device 130 as a function of a planned vehicle movement F.

In a second step St2, the request signal S1 is plausibility-checked by the monitoring device 140, wherein, to this end, in a partial step St2.1, a time shift dt of the requested target vehicle velocity vTarget is compared to the requested target vehicle acceleration aTarget. In a partial step St2.2, it can furthermore be plausibility-checked whether the requests aTarget, vTarget, RTarget, LTarget are monotonous, i.e. whether or not they contain jumps. In a further partial step St2.3 it can be plausibility checked whether a transmission error from the third control device 130 and/or to the first control device 110 is present, i.e. whether the request signal S1 cannot be transmitted, or cannot be transmitted completely, via the CAN bus 60, for example because the third control device 130 has a defect or has failed or the first control device 110 no longer receives request signals S1, which can be conveyed via the diagnostic signal SD1 or SD6.

In a further partial step St2.4, the target longitudinal vehicle dynamics DTarget are compared to the actual longitudinal vehicle dynamics DActual and, in a third step St3, additional longitudinal dynamics limit values DLimit are used to check whether the actual longitudinal vehicle dynamics DActual can ensure safe automatic operation. In a further partial step St2.5 it is checked whether the actuators 1, 50, 51, 52, 53 have a defect, wherein, to this end, the diagnostic signal SD2, SD3, SD4, SD5 of the respective actuator 1, 50, 51, 52, 53, 54, which is generated in an on-board diagnostic procedure, is used.

In a fourth step St4, a correction deceleration zCorr and/or a correction velocity vCorr is identified as a function of the plausibility-check in step St2 and St3 and conveyed via the correction signal SK to the second control device 120, which then induces corrective braking in a fifth step St5. In parallel to the steps St2 to St5, braking StB via the wheel brakes 1 can already take place, for example specified by the first or the second control device 110, 120. Corrective intervention in this braking is carried out in step St5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 Wheel brakes
2 Wheels of the utility vehicle 200
3 Vehicle axle/front axle
4 ABS brake valve
10 Control valve
20 Redundancy arrangement
21 (First) redundancy valve
22 Second redundancy valve/parking brake valve
30 Redundant velocity sensor
30a Velocity sensor
40 Foot brake valve
50 Engine
51 Steering
52 Gear unit
53 Sustained-action brake
60 CAN bus
70 Engine shut-off device
100 Pneumatic brake system
110 First control device
120 Second control device
130 Third control device
140 Monitoring device
200 Utility vehicle
aActual Actual vehicle acceleration
aMax Maximum acceleration
aTarget Target vehicle acceleration
DActual Actual longitudinal vehicle dynamics
DTarget Target longitudinal vehicle dynamics
dt Time period
L Steering angle
LTarget Target steering angle
pA Wheel-brake brake pressure
pPB Parking-brake brake pressure
pR Redundancy control pressure
R Direction
RActual Actual vehicle direction
RTarget Target vehicle direction
S1 Request signal
S2 Driver signal
SA Control-valve control signal
SD1, SD2, SD3, SD4, Diagnostic signals
SD5, SD6
SK Correction signal
SR Redundancy signal
T Tolerance
vActual Actual vehicle velocity
vMax Maximum velocity
vTarget Target vehicle velocity
x Longitudinal direction
zPB Parking-brake specification
St1, St2, St2.1, St2.2, Method steps
St2.3, St2.4, St2.5,
St3, St4, St5

The invention claimed is:

1. A method for automatic electronic control of a brake system in a vehicle, the method comprising:
reading a request signal for automatic electronic control of actuators in the vehicle, wherein at least one of the actuators has an influence on actual longitudinal vehicle dynamics of the vehicle, and wherein requests that are to be implemented by the actuators for realizing automatically requested target longitudinal vehicle dynamics are transmitted via the request signal;
plausibility-checking the request signal to establish whether the requests are, or can be, implemented completely or without error by the actuators, taking into account a tolerance;
determining a correction deceleration and/or a correction velocity if the implementation of at least one of the requests has not taken place, or cannot take place, completely or without error, taking into account the tolerance, in order to specify corrective braking, wherein the correction deceleration and/or the correction velocity are stipulated as a function of the at least one of the requests which has not taken place, or cannot take place, completely or without error; and requesting the corrective braking of the vehicle as a function of the correction deceleration and/or the correction velocity for bringing the vehicle into a safe state, wherein the request signal is plausibility-checked in that the actual longitudinal vehicle dynamics are compared to the target longitudinal vehicle dynamics automatically specified by the request signal, and wherein, to this end, an actual vehicle acceleration is compared to a target vehicle acceleration and/or an actual vehicle velocity is compared to a target vehicle velocity and/or an actual vehicle direction is compared to a target vehicle direction.

2. The method as claimed in claim 1, wherein the actual vehicle direction and the target vehicle direction are specified as a result of whether the actual vehicle velocity or the target vehicle velocity are higher or lower than zero.

3. The method as claimed in claim 1, wherein, in the event of a compensable deviation between the actual longitudinal vehicle dynamics and the target longitudinal vehicle dynamics and therefore an incomplete or incorrect implementation of the automatically specified requests, a correction deceleration compensating for this deviation and/or a correction velocity compensating for this deviation are identified and output.

4. The method as claimed in claim 1, wherein, in the event of a non-compensable deviation between the actual longitudinal vehicle dynamics and the target longitudinal vehicle dynamics and therefore an incomplete or incorrect implementation of the automatically specified requests, a correction velocity and/or a correction deceleration are identified and output, as a result of which the vehicle is braked to the stationary state or to a safe velocity.

5. The method as claimed in claim 4, wherein the braking to the stationary state or to the safe velocity takes place with a correction deceleration of between $-2$ m/s$^2$ and $-4$ m/s$^2$.

6. The method as claimed in claim 1, wherein the correction deceleration and/or the correction velocity are only output if ABS control intervention has not been detected.

7. The method as claimed in claim 1, wherein, for plausibility-checking the request signal, it is established whether the automatically specified requests have been, or can be, implemented completely or without error by those actuators which realize a positive target vehicle acceleration and/or via which a target vehicle direction is set.

8. The method as claimed in claim 7, wherein it is monitored whether, as a result of a requested positive target vehicle acceleration, a target vehicle velocity, which is higher by a corresponding amount, and/or, as a result of a requested increasing target vehicle velocity, a correspondingly positive target vehicle acceleration and/or a requested target vehicle direction, are, or can be, implemented to establish whether a complete or error-free implementation of the automatically specified target vehicle dynamics is taking place or could take place.

9. The method as claimed in claim 1, wherein the request signal is plausibility-checked as a function of whether a transmission error to the actuators has been established, wherein, in the event of establishing a transmission error and therefore an incompletely or incorrectly implementable, automatically specified request, a correction velocity and/or a correction deceleration is identified and output, as a result of which the vehicle is braked to the stationary state or to a safe velocity.

10. The method as claimed in claim 9, wherein a transmission error is transmitted to a monitoring device via a diagnostic signal, wherein a transmission error to the first control device and/or from a third control device is established in an on-board diagnostic procedure.

11. The method as claimed in claim 1, wherein the request signal is plausibility-checked as a function of whether the requests, transmitted via the request signal, for the automatic control of the vehicle are monotonous, wherein, in the event of establishing that the requests for the automatic control of the vehicle are not monotonous and therefore an incompletely or incorrectly implementable, automatically specified request is present, a correction velocity and/or a correction deceleration is identified and output, as a result of which the vehicle is braked to the stationary state or to a safe velocity.

12. The method as claimed in claim 1, wherein the request signal is plausibility-checked as a function of whether one of the actuators has a defect, wherein, in the event of establishing a defect and therefore an incompletely or incorrectly implementable, automatically specified request, a correction velocity and/or a correction deceleration is identified and output, as a result of which the vehicle is braked to the stationary state or to a safe velocity.

13. The method as claimed in claim 12, wherein a defect in the actuators is transmitted via a diagnostic signal, wherein a defect in the respective actuator is established in an on-board diagnostic procedure.

14. The method as claimed in claim 1, wherein, when determining the correction deceleration and/or the correction velocity, longitudinal dynamics limit values are taken into account, wherein the longitudinal dynamics limit values include a maximum velocity and/or a maximum acceleration.

15. The method as claimed in claim 1, wherein, in the event of establishing an incorrect or incomplete implementation of the automatically specified requests, automatically requested braking is overridden by the correction deceleration and/or the correction velocity.

16. The method as claimed in claim 1, wherein the corrective braking takes place via a redundancy arrangement formed in the vehicle, which is designed for redundant braking of the vehicle.

17. The method as claimed in claim 16, wherein, if an electronic control of the wheel brakes via a first control device or the electronically controllable pneumatic brake system fails, the redundancy arrangement can brake the vehicle electronic-pneumatically via wheel brakes in order to provide an electronic-pneumatically controlled redundancy.

18. The method as claimed in claim 1, wherein the actual longitudinal vehicle dynamics are plausibility-checked by redundant wheel speed sensors.

19. The method as claimed in claim 1, wherein an automatically requested target vehicle steering angle is also plausibility checked, wherein it is reported to a monitoring device via a third diagnostic signal whether the automatic steering has a defect and therefore whether an incomplete or incorrect implementation of the automatically requested target vehicle steering angle is present or can be present.

20. A method for automatic electronic control of a brake system in a vehicle, the method comprising:

reading a request signal for automatic electronic control of actuators in the vehicle, wherein at least one of the actuators has an influence on actual longitudinal vehicle dynamics of the vehicle, and wherein requests that are to be implemented by the actuators for realizing automatically requested target longitudinal vehicle dynamics are transmitted via the request signal;

plausibility-checking the request signal to establish whether the requests are, or can be, implemented completely or without error by the actuators, taking into account a tolerance;

determining a correction deceleration and/or a correction velocity if the implementation of at least one of the requests has not taken place, or cannot take place, completely or without error, taking into account the tolerance, in order to specify corrective braking, wherein the correction deceleration and/or the correction velocity are stipulated as a function of the at least one of the requests which has not taken place, or cannot take place, completely or without error; and requesting the corrective braking of the vehicle as a function of the correction deceleration and/or the correction velocity for bringing the vehicle into a safe state, wherein the request signal is plausibility-checked as a function of whether a time shift of a requested target vehicle velocity corresponds to a requested target vehicle acceleration, wherein, in the event of establishing a deviation and therefore an incompletely or incorrectly implementable, automatically specified request, a correction velocity and/or a correction deceleration is identified and output, as a result of which the vehicle is braked to the stationary state or to a safe velocity.

21. An electronically controllable pneumatic brake system, comprising:

a first control device, which, for the electronically controlled braking of the vehicle in normal automatic operation, is configured to provide wheel-brake brake pressures to wheel brakes of the vehicle as a function of an automatically specified target vehicle acceleration, and/or an automatically specified target vehicle velocity via at least one at least electronically controllable control valve, and a redundancy arrangement having at least one redundancy valve and a second control device configured to control the at least one redundancy valve, wherein, to provide an electronic-pneumatically controlled redundancy, the redundancy arrangement is further configured to request redundant braking by the wheel brakes via the redundancy valve as a function of the automatically specified target vehicle acceleration and/or the automatically specified target vehicle velocity if the electronic control of the wheel brakes via the first control device fails, a monitoring device configured to plausibility-check a request signal, automatically specified by a third control device, for the automatic control of actuators in the vehicle to establish whether requests transmitted via the request signal are or can be implemented without error or completely, wherein, as a function of the plausibility-check of the monitoring device, a correction deceleration and/or a correction velocity is identified and output to the redundancy arrangement via a correction signal for realizing redundant, corrective braking by the wheel brakes for bringing the vehicle into a safe state, wherein the monitoring device is configured to plausibility check the request signal by comparing the actual longitudinal vehicle dynamics to the target longitudinal vehicle dynamics automatically specified by the request signal, and, to this end, compare an actual vehicle acceleration to a target vehicle acceleration and/or compare an actual vehicle velocity to a target vehicle velocity and/or compare an actual vehicle direction to a target vehicle direction.

22. The electronically controllable brake system as claimed in claim 21, wherein an electronic brake request is specified to the control valve by the first control device and a pneumatic brake request is specified to the control valve by the redundancy arrangement in the redundancy situation.

23. The electronically controllable brake system as claimed in claim 21, wherein the at least one redundancy valve is a pressure control valve and/or a parking brake valve.

24. The electronically controllable brake system as claimed in claim 21, wherein the monitoring device is integrated in the second control device.

25. A vehicle, comprising:

an electronically controlled pneumatic brake system as claimed in claim 21, and a regulating system for the automatic control of actuators of the vehicle via the third control device.

* * * * *